April 13, 1971   L. A. HEREDY ET AL   3,574,544
SINGLE-STAGE PROCESS FOR RECOVERING SULFUR VALUES
Original Filed May 15, 1967
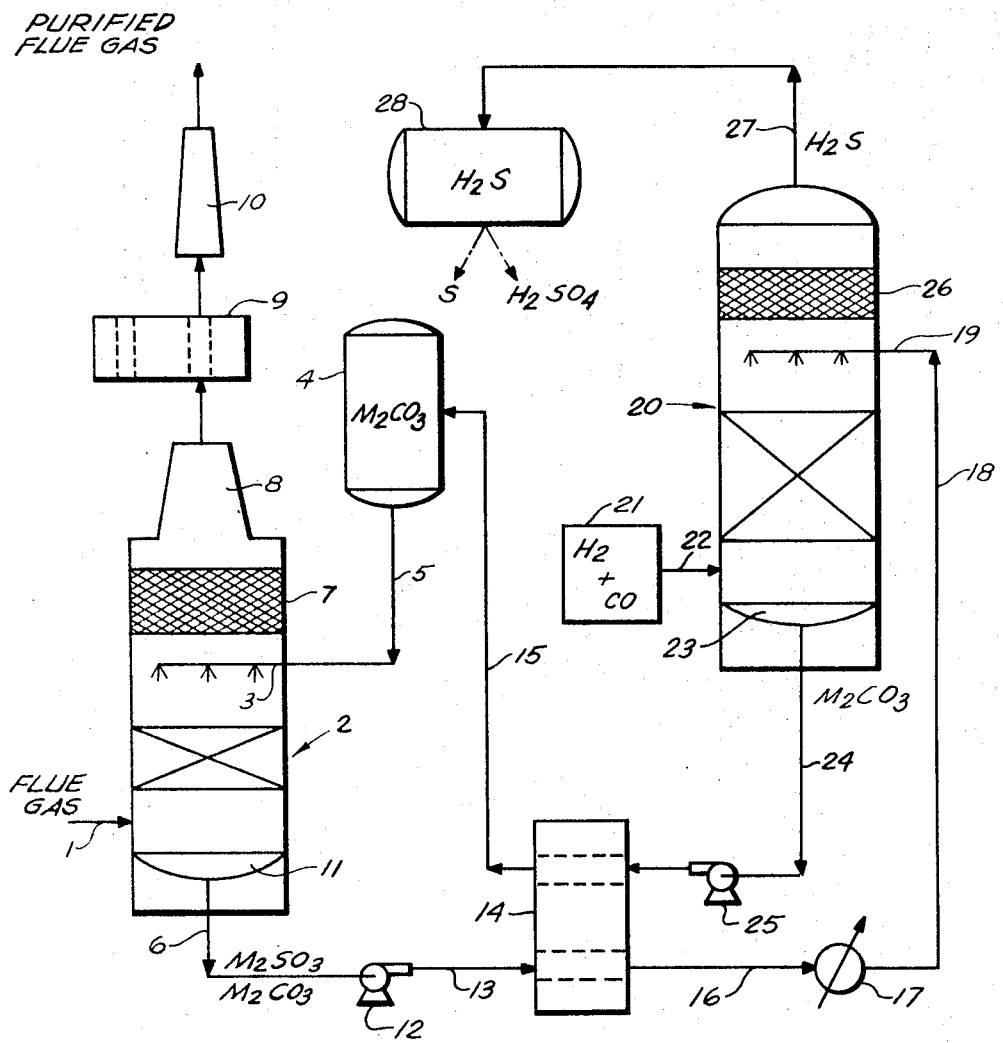
INVENTOR
LASZLO A. HEREDY
DONALD E. McKENZIE
SAMUEL J. YOSIM
Henry Kolin
ATTORNEY

United States Patent Office 3,574,544
Patented Apr. 13, 1971

3,574,544
SINGLE-STAGE PROCESS FOR RECOVERING
SULFUR VALUES
Laszlo A. Heredy, Canoga Park, and Donald E. McKenzie and Samuel J. Yosim, Woodland Hills, Calif., assignors to North American Rockwell Corporation
Original application May 15, 1967, Ser. No. 638,528, now Patent No. 3,438,722, dated Apr. 15, 1969. Divided and this application Nov. 26, 1968, Ser. No. 779,172
The portion of the term of the patent subsequent to Apr. 15, 1986, has been disclaimed
Int. Cl. C01b 17/16
U.S. Cl. 23—181
5 Claims

ABSTRACT OF THE DISCLOSURE

A method for recovering sulfur values from a molten salt mixture containing alkali metal sulfates or sulfites by reacting the alkali metal sulfate- or sulfite-containing molten solution in a single-stage treatment with a gaseous mixture containing hydrogen and either carbon monoxide or carbon dioxide to form hydrogen sulfide and alkali metal carbonates in the molten salt.

CROSS REFERENCES TO RELATED APPLICATIONS

This is a division of application Ser. No. 638,528, filed May 15, 1967, now U.S. Pat. 3,438,722, which describes a method for removing sulfur dioxide from flue gas by absorption of the sulfur dioxide in a molten alkali metal carbonate mixture to provide a feedstock for the one stage process of the present invention.

Other processes that may be utilized for treatment of the resultant absorbent solution provided by the process described in U.S. 3,438,722 are described in the following patent applications, all filed of even date herewith and assigned to the assignee of the present invention: "Two-Stages Process for Recovering Sulfur Values," S.N. 779,176; "Carbonaceous Process for Recovering Sulfur Values," S.N. 779,118; "Carbon Oxide Regenerant for Sulfur Production," S.N. 779,175; "Carbonaceous Process for Sulfur Production," S.N. 779,173, now U.S. Pat. 3,516,796; and "Electrochemical Process for Recovering Sulfur Values," S.N. 779,119.

BACKGROUND OF THE INVENTION

This invention relates to a process for the removal of sulfur compounds from molten salts. It particularly relates to a process wherein sulfur values are recovered from a molten salt mixture containing alkali metal sulfates or sulfites by treatment of the molten salt mixture in a single-stage process with a gaseous mixture containing hydrogen and a carbon oxide.

Sulfur oxides, principally as sulfur dioxide, are present in the waste gases discharged from many metal refining and chemical plants and in the flue gases from power plants generating electrically by the combustion of fossil fuels. The control of air pollution resulting from this discharge of sulfur oxides into the atmosphere has become increasingly urgent. An additional incentive for the removal of sulfur oxides from waste gases is the recovery of sulfur values otherwise lost by discharge to the atmosphere. However, particularly with respect to the flue gases from power plants, which based on the combustion of an average coal may contain as much as 3000 p.p.m. sulfur dioxide and 30 p.p.m. sulfur trioxide by volume, the large volumes of these flue gases relative to the quantity of sulfur which may contain make removal of the sulfur compounds from these gases expensive. Also, while the possible byproducts, such as elemental sulfur and sulfuric acid, that may be ultimately obtained from the recoverable sulfur values have virtually unlimited markets as basic raw materials, they sell for relatively low figures. Consequently, low-cost recovery processes are required. The absorption process described in U.S. 3,438,722, wherein sulfur dioxide present in flue gas is absorbed in a molten alkali metal carbonate mixture, provides one source for a molten salt composition treated by the present process.

SUMMARY OF THE INVENTION

It is an object of the present invention to provide a highly efficient method for recovering sulfur values from molten salt compositions using inexpensive, readily available materials and avoiding the use of expensive equipment. These sulfur values are readily convertible to sulfur or sulfuric acid as marketable products.

In accordance with this invention, a sulfur removal process is provided comprising reacting a molten salt mixture containing alkali metal sulfates, alkali metal sulfites, or mixtures thereof in a single-stage process at a temperature of at least 400° C., generally between 400 and 650° C. and preferably between 500 and 600° C. with a gaseous mixture containing hydrogen and either carbon monoxide or carbon dioxide or mixtures thereof to form alkali metal carbonates in the molten salt and hydrogen sulfide gas as a recoverable product. The reaction is preferably performed at atmospheric pressure, thereby simplifying equipment requirements and costs.

In a preferred aspect of practicing this invention, one source of the sulfate- or sulfite-containing molten salt mixture is that obtained by treatment of a combustion gas containing $SO_2$ with a molten ternary salt mixture of the carbonates of lithium, sodium, and potassium, molten at 400° C., to convert the $SO_2$ present to alkali metal sulfite according to the following equation:

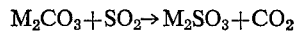

$$M_2CO_3 + SO_2 \rightarrow M_2SO_3 + CO_2$$

where M denotes a ternary mixture of Li, Na, K, excess $M_2CO_3$ molten salt being used as carrier solvent. Suitably, this preferred reaction is performed at a temperature between 395 and 600° C. and particularly between 400 and 450° C., approximately corresponding to the temperature of a typical power plant flue gas. The molten product of reaction consisting of alkali metal sulfite dissolved in molten alkali metal carbonate and optionally containing a fused-salt diluent is treated with a gaseous mixture preferably containing hydrogen and carbon monoxide, preferably water gas or producer gas, at a temperature between 400 and 650° C. preferably between 500 and 600° C. The mixed alkali metal carbonates are regenerated and at the same time hydrogen sulfide is formed, essentially in accordance with the following equations:

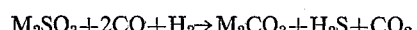
$$M_2SO_3 + 2CO + H_2 \rightarrow M_2CO_3 + H_2S + CO_2$$

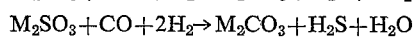
$$M_2SO_3 + CO + 2H_2 \rightarrow M_2CO_3 + H_2S + H_2O$$

$$2M_2SO_3 + 3CO + 3H_2 \rightarrow 2M_2CO_3 + 2H_2S + CO_2 + H_2O$$

Where the reactant gas mixture consists of hydrogen and carbon dioxide, the following reaction occurs:

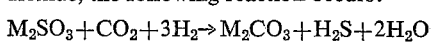
$$M_2SO_3 + CO_2 + 3H_2 \rightarrow M_2CO_3 + H_2S + 2H_2O$$

A portion of the carbon dioxide may be converted to carbon monoxide by reaction with hydrogen. Commercial processes are known and available for utilizing the obtained hydrogen sulfide as a suitable feedstock for a sulfuric acid plant or for production of elemental sulfur.

BRIEF DESCRIPTION OF THE DRAWING

The sole figure of the drawing shows a schematic flow diagram illustrating the single-stage process for a preferred embodiment of the invention in conjunction with an absorption stage for the treatment of hot combustion gases obtained by the burning of a sulfur-containing fossil fuel in an electric generating plant.

DESCRIPTION OF THE PREFERRED EMBODIMENTS

In the broadest aspects of this invention, a molten salt mixture containing alkali metal sulfite or alkali meta sulfate is treated with a gaseous mixture of hydrogen and a carbon oxide in a single-stage process to form alkali metal carbonates in the molten salt and hydrogen sulfide gas as a recoverable product. The process will be particularly described in conjunction with a prior absorption stage, not a part of this invention, which may be employed to provide one source for a molten salt composition treated by the present process. The absorption stage per se is shown in U.S. 3,438,722, incorporated herein by reference.

This prior absorption stage is of significance because of the present requirements for an effective, economical process for the elimination of air pollution caused by the emission of sulfur oxides into the atmosphere. Thus the present invention directed to a single-stage process for the recovery of sulfur values as hydrogen sulfide from certain molten salt compositions will be particularly illustrated in conjunction with this prior absorption stage for the removal of sulfur oxides from hot combustion gases obtained by the burning of sulfur-containing fossil fuels, particularly electric generating plants. In these plants, the combustion of a ton of an average coal containing 3.4% sulfur typically yields about 400,000 standard cubic feet of stack gases that contain 3000 p.p.m. sulfur dioxide and 30 p.p.m. sulfur trioxide by volume, i.e., a sulfur dioxide content of less than 0.5 vol. percent. Consequently, the economic and efficient removal of the small sulfur dioxide content compared with the larger flue gas volume, before discharge of the sulfur dioxide into the atmosphere, is a difficult one. Further, the ultimate disposal of the removed sulfur dioxide, preferably by regeneration of the absorbent used and conversion of the absorbed sulfur values to utilizable byproducts, also requires solution.

Referring to the drawing, a flue gas obtained from the combustion of a sulfur-containing coal and at a temperature of about 425±25° C. is admitted by way of a conduit 1 to an absorber unit 2. For a typical 1000-m.w.(e.) coal-fired electric utility plant utilizing coal containing 3 wt. percent sulfur, about 4,650,000 cu. ft./min. flue gas with an $SO_2$ content of about 0.16 vol. percent is generated. The flue gas is passed through a fly ash precipitator (not shown) to remove fine particles entrained therein, prior to entry into the absorber. For a 1000-m.w.(e.) plant, absorber unit 2 ordinarily consists of five stainless steel cyclone spray towers in parallel arrangement. These towers are suitably insulated with about 5 inches of high temperature insulation so that the temperature drop within them is less than five degrees centigrade.

The flue gas enters tangentially at the base of absorber 2 and travels upwardly with a velocity of about 20 ft./sec. It is contacted countercurrently by a spray of molten carbonate (M.P. about 400° C.) which is discharged through a spray distributor 3 located about 15 ft. above the base of the absorber tower. The molten carbonate salt is contained in a storage vessel 4, which is suitably insulated and equipped with heaters so as to maintain the carbonate salt in a molten state. The molten salt leaves vessel 4 by way of a conduit 5 connected to spray distributor 3 at a flow rate adjusted to provide about 10–30 mole percent sulfite content in the effluent molten salt stream leaving the bottom of absorber 2 by way of a conduit 6.

After contacting the molten carbonate spray, the desulfurized flue gas flows past distributor 3 into a wire demister 7, which is about 1 foot thick and located in the upper section of the absorber tower about two feet above the distributor. The demister serves to remove entrained salt-containing droplets from the flue gas, which is then passed through a conical transition section 8 to minimize pressure drops in the absorber tower and then through a plurality of heat exchangers 9, from which it emerges at a temperature of about 150° C. Heat exchangers 9 may serve as preheaters for the water and the air used in the generating plant. The cooled flue gas from heat exchangers 9 is discharged to the atmosphere through a power plant stack 10.

The molten mixture of alkali metal carbonates in vessel 4 serves as the active absorbent. Where the melt consists essentially of only the alkali metal carbonates, a ternary mixture consisting of potassium carbonate, lithium carbonate, and sodium carbonate is utilized having a melting point between 400 and 600° C. While the individual melting points of the three carbonates fall within the range of 725 to 900° C., a mixture containing approximately equal amounts by weight of the carbonates of potassium, lithium and sodium has a melting point of about 395° C., about that of the eutectic composition.

Other nonreactive molten salts may be combined with the alkali metal carbonates to serve as inexpensive diluents or to lower the temperature. For example, lithium-potassium salt mixture containing chloride, sulfite, and carbonate is molten at a temperature of 325° C. Where such diluent salts are utilized, either a single alkali metal carbonate or a binary or ternary mixture of the alkali metal carbonates is combined therewith, the final mixture containing two or more alkali metal cations. In such a system as little as 2 mole percent of alkali metal carbonate may be present with the remaining 98 mole percent being an inert diluent carrier, although at least 5–10 mole percent of alkali metal carbonate is preferable. Illustrative of such a suitable mixture is one utilizing a LiCl-KCl eutectic (M.P. 348° C.) wherein the starting salt ratio consists of 64.8 mole percent LiCl and 35.2 mole percent KCl. An absorbent molten mixture containing 90 mole percent of the LiCl-KCl eutectic and 10 mole percent of a corresponding molar ratio of potassium and lithium carbonates has a melting point of about 375° C. Suitable chloride-carbonate molten salt mixtures useful in the practice of this invention contain, in mole percent, 15–60 $K^+$, 40–85 $Li^+$, and 0–20 $Na^+$ as cations and 10–98 $Cl^-$ and 2–90 $CO_3^=$ as anions.

Although the melting points of the pure alkali metal sulfites and suldes are considerably higher than those of the mixed alkali metal carbonates, it has further been discovered that if a sulfite or sulfide is substituted for only a portion of the carbonate the melting point is lowered, thereby making feasible the circulation of sulfite-containing carbonate melt without the need for additional heat input to keep the circulated salt molten, which would be required were sulfite obtained alone as the reaction product. An alkali metal sulfite content of 10–30 mole percent of the molten salt is preferred.

The molten sulfite-containing carbonate resulting from the rapid reaction between molten carbonate spray and the flue gas is collected in a dished-bottom heated sump 11 of absorber 2. About a 70 mole percent excess of unreacted carbonate is maintained to serve as a solvent for the sulfite formed by the reaction. The sulfite-carbonate mixture is pumped from sump 11 of absorber 2 through conduit 6 by way of a pump 12, then through a conduit 13 to a heat exchanger 14. The sulfite-carbonate mixture entering heat exchanger 14 is at a temperature of about 425±25° C. Its temperature is increased in the heat exchanger and at the same time the temperature of regenerated molten carbonate feed stock being returned to storage vessel 4 by way of a conduit 15 is lowered. The sulfite-carbonate mixture leaves heat exchanger 14 by way of a conduit 16 and passes through a heater 17, which is optionally utilized for further increasing the temperature of the mixture, where required, to about 550±50° C. The mixture leaves heater 17 through a conduit 18 where it is fed into a spray distributor 19 in a regenerator unit 20. Other gas-liquid contact techniques, similar to those usable for absorber unit 2, may also be used for the regeneration reaction.

The over-all chemical reaction in the regenerator unit involves concurrent reduction of the alkali metal sulfite to hydrogen sulfide and regeneration of alkali metal carbonate by treatment of the alkali metal sulfite-carbonate melt with a gaseous mixture containing hydrogen and carbon monoxide or carbon dioxide in accordance with any combination of the following exemplary equations:

$$M_2SO_3 + 2CO + H_2$$
$$M_2SO_3 + CO + 2H_2$$
$$2M_2SO_3 + 3CO + 3H_2$$
$$M_2SO_3 + CO_2 + 3H_2$$
$$M_2CO_3 + H_2S + CO_2$$
$$M_2CO_3 + H_2S + H_2O$$
$$2M_2CO_3 + 2H_2S + CO_2 + H_2O$$
$$M_2CO_3 + H_2S + 2H_2O$$

while $H_2S$ will be obtained in all cases from the reduction of the alkali metal sulfite, either carbon dioxide or water or both will be additionally obtained depending upon the relative proportions of the hydrogen and carbon oxides in the regenerant gas mixture. While the exact machanism of regeneration is but imperfectly understood, it is believed, without intending to be limited by this explanation, that alkali metal sulfide may be formed as an intermediate reaction product. However, this compound, if formed should be converted during the course of the reaction to carbonate and hydrogen sulfide by the gaseous products formed during the reaction, depending upon reaction conditions in the regenerator. High contact efficiency between the gaseous and liquid phases and prolonged times of contact, as well as temperature optimization favor the above reactions to the detriment of competing reactions or formation or accumulation of intermediate products.

The regenerant gaseous mixture of hydrogen and carbon monoxide or carbon dioxide or mixtures thereof may be obtained by mixing the two or three pure gases in desired proportions. Or a gaseous mixture may be prepared in situ in the regenerator by feeding in a mixture of hydrogen and carbon dioxide, a portion of the carbon dioxide then being reduced to carbon monoxide by reaction with hydrogen. Or steam and carbon monoxide may be used as a reactant gaseous mixture, at least a portion thereof being converted to hydrogen and carbon dioxide, the unconverted CO serving as principal reductant. However, from the point of view of process economics, the gaseous mixture utilized is ordinarily obtained from a synthesis gas plant as a water gas, producer gas, coal gas, or carburetted water gas. A representative water gas or blue gas obtained by the decomposition of steam in the presence of an incandescent carbon source, such as bituminous coal or coke, typically contains 40% CO, 48% $H_2$, 5% $CO_2$, 6% $N_2$, and 1% $CH_4$, by volume. A representative producer gas obtained by the partial combustion of a carbonaceous fuel in air contains 25–35% CO, 10–15% $H_2$, 3–7% $CO_2$, balance $N_2$, by volume. Preferably, the water gas or producer gas utilized is provided by a synthesis gas plant adjunct capable of delivering ash-free gas for the regenerator unit.

Referring to the drawing, a regenerant gas mixture containing hydrogen and carbon monoxide provided by a synthesis gas plant 21 enters the base of regenerator 20 by way of a conduit 22. The molten sulfite-carbonate mixture sprayed from distributor 19 reacts with the regenerant gas which is present in about 15% excess. The molten alkali metal carbonate, including both regenerated and carrier carbonate, is collected in a sump 23 at the base of regenerator 20, from where it is fed by way of a conduit 24 by means of a pump 25 to heat exchanger 14, where it loses heat, and then is returned to storage vessel 4 by way of conduit 15. The reconverted carbonate is then recycled to absorber 2 by way of conduit 5.

The hydrogen sulfide-rich gas mixture produced in the regeneration reaction also contains minor amounts of COS, S, $CO_2$, $H_2O$, and excess reducing gas. This gas mixture passes through a demister 26, which removes entrained liquid particle, and leaves regenerator 20 by way of a conduit 27 where it is fed to a processing plant 28, schematically shown as a hydrogen sulfide storage vessel.

To obtain sulfuric acid, the hydrogen sulfide-rich gas is oxidized to $SO_2$, which is then catalytically converted to $SO_3$ by a chamber process or contact process, the $SO_3$ being then absorbed in 98–99 wt. percent sulfuric acid. Alternatively, the $H_2S$-rich mixture is fed to a Claus reactor for conversion to elemental sulfur. The hydrogen sulfide feedstock provided by the present process is ideally suitable for conversion to sulfuric acid or to sulfur on an industrial scale by the foregoing well-known techniques. The selection of the final product, i.e., sulfuric acid or sulfur, will be determined generally by economic and marketing considerations.

The following examples illustrate the practice of the invention but are not intended to unduly limit the generally broad scope of the present invention.

EXAMPLES $SO_2$ absorption from flue gas

The molten salt composition treated by the present process will be illustrated with respect to a suitable molten salt composition obtained by a prior absorption step.

(a) Preparation of molten salt composition

A suitable molten salt composition was obtained by absorbing $SO_2$ gas in a molten carbonate melt. The feed gas consisted of $CO_2$ containing 0.1 to 20 vol. percent $CO_2$. The molten carbonate melt consisted of a ternary mixture of the carbonates of lithium, sodium, and potassium of approximately eutectic composition and was maintained at a temperature of about 500° C. The flow of $SO_2$ through the melt was varied from 1.5 to 24 ml./min. These flow rates provided a very short contact time between gas and melt since the gas inlet bubbler was about ¼-inch in diameter and was located about 1 inch below the liquid level. The inlet gas was preheated to about 400° C. before contacting the melt.

The final concentration of resultant alkali metal sulfite in molten carbonate varied from about 10 to 19.1 mole percent sulfite for feed gases having an initial concentration ranging from 1 to 18.2 vol. percent $SO_2$. Material balance analyses based on wet chemical analysis and gas chromatographic analysis together with continuous monitoring of the off flue gas showed that more than 99.9% of the $SO_2$ content was removed from the simulated flue gas.

In another series of runs the effect of using a lower reaction temperature was evaluated, other experimental conditions being essentially similar to those described above. The temperature of the ternary molten salt mixture was maintained below 425° C., and the inlet gas was not preheated prior to contacting the melt. Analysis showed that more than 99% of the $SO_2$ was removed from the simulated flue gas.

The effect upon $SO_2$ absorption of an increasing concentration of alkali metal sulfite in the ternary eutectic alkali metal carbonate melt was also evaluated. It was found that removal of the $SO_2$ from the flue gas proceeded nearly quantitatively even after more than 30% of the alkali metal carbonate had been converted to alkali metal sulfite.

(b) Conversion of alkali metal sulfite in molten salt

An alkali metal sulfite-carbonate melt was prepared substantially as above described by bubbling $SO_2$ gas through a ternary alkali metal carbonate melt of eutectic composition at a temperature of 450° C. The melt contained 13.9 wt. percent $M_2SO_3$ and 81.8 wt. percent $M_2CO_3$, where M denotes a ternary mixture of Li, Na, K. The melt was contacted with an approximately equimolar mixture of hydrogen and carbon monoxide gases at a temperature between 450 and 600° C. in a reaction vessel using stainless steel wire mesh packing in order to increase the melt surface area to provide greater melt-to-gas contact. The feed gas and off gas were monitored continuously using gas chromatography, and the melt was analyzed by a gas chromatographic technique. Analysis of the melt showed that all of the alkali metal sulfite had been converted. However, because competing side reactions were not controlled in this experiment, most of the conversion was to alkali metal sulfate.

To minimize the occurrence of side reactions, a reductant gas mixture simulating a producer gas in composition was prepared in the reaction vessel in situ, using as the initial feed gas an equimolar mixture of hydrogen and carbon dioxide. The resultant reductant feed gas, which was bubbled through the sulfite-containing carbonate melt, consisted of a mixture of $CO_2$, CO, $H_2$, and $H_2O$. The reaction was carried out at a temperature of 500° C. Analysis of the sulfite-carbonate melt showed that the $M_2SO_3$ content had been reduced from 13.9 wt. percent to about 1.5 wt. percent, with the off-gas mixture containing 4–9 wt. percent $H_2S$, the balance of the gas mixture containing 1–9 wt. percent CO, 40–60 wt. percent $H_2$, and 25–45 wt. percent $CO_2$.

The present single-stage process for the recovery of sulfur values as hydrogen sulfide from certain molten salt compositions has been illustrated in conjunction with the removal of $SO_2$ gas. However, the presence in the flue gas of $SO_3$, which is ordinarily but a minor fraction of the sulfur oxide content, does not interfere with the operation of the process. Thus, any $SO_3$ gas initially present is converted to alkali metal sulfate and fed to the regenerator along with the sulfite-carbonate mixture. During the regeneration step, the sulfate will be reduced in a similar manner corresponding to the reduction of sulfite.

It will, of course, be realized that many variations in reaction conditions may be used in the practice of this invention. While certain exemplary reactions have been described for the process of the present invention, it has been found that the actual mechanism of reaction is a highly complex one and several competing reactions may occur simultaneously. Therefore, to optimize the process, varying reaction temperatures and pressures may be employed, as well as the use of catalysts and means for providing greater surface contact between the regenerant gas and the melt. Also, there may be employed a batch process or a continuous process, preferably the latter, with the usual provision for recycle of various unreacted or partially reacted mixture components. Further, even where the desired reactions do not go to completion and products are also present produced by competing or undesired side reactions, the unreacted or undesired products may be recycled in the process without substantial interference therewith. Thus, while the examples illustrating this invention have been described with respect to specific concentrations, times, temperatures and other reaction conditions, the invention may be otherwise practiced by those skilled in this art without departing from the spirit and scope thereof.

We claim:
1. The process for recovering sulfur values as hydrogen sulfide gas from alkali metal sulfates, alkali metal sulfites, or mixtures thereof which comprises providing an inorganic molten salt containing said alkali metal sulfates, alkali metal sulfites, or mixtures thereof, as reactive material therein, reacting said molten salt at a temperature of at least 400° C. in a liquid-gas phase reaction with a gas mixture containing as reactive component a gas composition consisting of hydrogen and carbon monoxide, hydrogen and carbon dioxide, or hydrogen, carbon monoxide, and carbon dioxide to form alkali metal carbonates in said molten salt and hydrogen sulfide gas as a recoverable product.

2. The process for recovering sulfur values as hydrogen sulfide gas from alkali metal sulfites which comprises providing an inorganic molten salt containing said alkali metal sulfites as reactive material therein, reacting said motlen salt at a temperature of at least 400° C. in a liquid-gas phase reaction with a gas mixture containing as reactive component a gas composition consisting of hydrogen and carbon monoxide, hydrogen and carbon dioxide, or hydrogen, carbon monoxide, and carbon dioxide to form alkali metal carbonates in said molten salt and hydrogen sulfide gas as a recoverable product.

3. The process according to claim 2 wherein the content of alkali metal sulfites in the molten salt prior to reaction is about 10–30 mole percent and said molten salt is reacted with said gas mixture at a temperature between 400 and 650° C.

4. The process according to claim 3 wherein said molten salt is reacted with said gas mixture at a temperature between 500 and 600° C.

5. The process according to claim 3 wherein said molten salt prior to said liquid-gas phase reaction consists essentially of a molten mixture of about 10–30 mole percent alkali metal sulfites and about 70–90 mole percent alkali metal carbonates.

References Cited

UNITED STATES PATENTS

| | | | |
|---|---|---|---|
| 3,401,010 | 9/1968 | Guerrieri | 23—181X |
| 3,148,950 | 9/1964 | Mugg | 23—224 |

OTHER REFERENCES

Janz et al., J. Chem. Eng. Data, vol. 6, pp. 321–323 (1961).

OSCAR R. VERTIZ, Primary Examiner

C. B. RODMAN, Assistant Examiner

U.S. Cl. X.R.

23—2.1